United States Patent [19]

Senour

[11] 4,401,375

[45] Aug. 30, 1983

[54] FLASH ADAPTER FOR FOLDING CAMERA

[76] Inventor: Stephen D. Senour, 2070 E. 54th St., Indianapolis, Ind. 46220

[21] Appl. No.: 314,714

[22] Filed: Oct. 26, 1981

[51] Int. Cl.$^3$ .............................................. G03B 15/05
[52] U.S. Cl. ................................................... 354/141
[58] Field of Search ............... 354/126, 129, 140, 141, 354/145, 295; 362/3, 8

[56] References Cited

U.S. PATENT DOCUMENTS

| 3,821,771 | 6/1974 | Johnson et al. | 354/293 |
| 3,858,227 | 12/1974 | Ellin et al. | 354/145 |
| 3,961,349 | 6/1976 | Forsyth et al. | 354/295 |
| 4,095,245 | 6/1978 | Kuraishi | 354/141 |
| 4,145,134 | 3/1979 | Kogure et al. | 354/295 |
| 4,285,589 | 8/1981 | Van Allen et al. | 354/145 |

FOREIGN PATENT DOCUMENTS 2511321 9/1975 Fed. Rep. of Germany ...... 354/141

OTHER PUBLICATIONS

"An Invitation to Sunpack Electronic Flash Photography", Sunpack Div., Berkey Marketing Co., Sunpack Corp., Tokyo, Japan.

*Primary Examiner*—John Gonzales
*Attorney, Agent, or Firm*—Hume, Clement, Brinks, Willian & Olds

[57] ABSTRACT

A flash adapter converts a folding camera that is adapted to operate a flash bar to use a conventional electronic flash. The flash adapter can comprise a resilient U-shaped bracket with a pair of legs adapted to fit the shutter housing of the folding camera and to engage its sides with a pair of thin protrusions on each leg of the bracket. The bracket can carry and interconnect electrically a conventional flash hot shoe and the flash socket assembly of the folding camera, and can support an electronic flash from the hot shoe. The electronic flash is operated by a signal from the camera through an electronic circuit carried by the bracket. Preferably, the electronic circuit is carried on a printed circuit board that comprises the plug electrically interconnecting the hot shoe on the bracket with the flash socket assembly. The electronic circuit provides a flash-ready signal to the camera and triggering of the electronic flash upon operation of the camera shutter. Features of the flash adapter permit it to remain connected to the camera when the camera is folded and not in use.

10 Claims, 5 Drawing Figures

U.S. Patent     Aug. 30, 1983     4,401,375
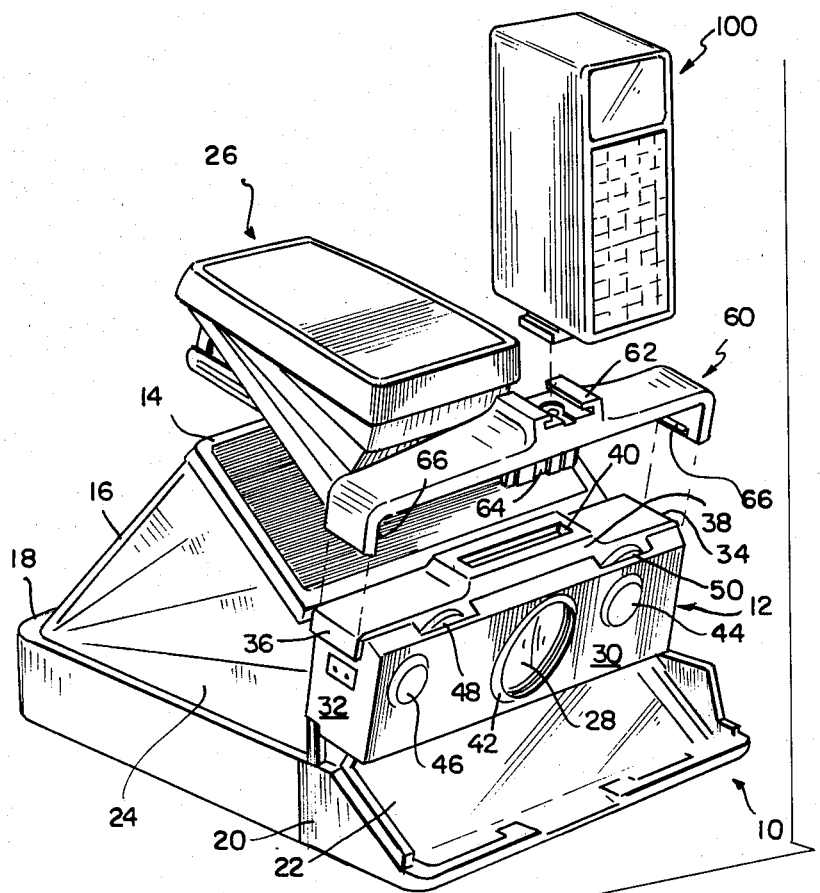

FLASH ADAPTER FOR FOLDING CAMERA

This invention relates to a flash adapter for a folding camera having a frontal housing carrying its lens and shutter mechanism and socket for operation of flash equipment.

Such cameras are disclosed in U.S. Pat. Nos. 3,714,879 and 3,810,211. A lens adapter for such cameras is disclosed in U.S. Pat. No. 3,961,349, and a tripod adapter is described in U.S. Pat. No. 3,821,771. Such cameras are compact, collapsible cameras of the self-developing type, for example, as sold by Polaroid Corporation under the trademark SX70.

The lens shutter housings of such cameras are generally of parallolepiped form having a front well in which an objective lens and camera-triggering device are mounted, and side, top, and bottom walls which extend rearwardly to form part of the light-tight closure. Various camera accessories for special photographic purposes are used with such cameras. These accessories include flash equipment, special lenses for close-ups, telephoto, and wide-angle photography, filters for haze and special effects, and remote and time-control equipment. It is a great convenience for the photographer to be able to attach and detach such auxiliary equipment quickly with a minimum of manipulation. Further, the accessories should be as compact as possible, so as not to overburden the photographer. These requirements are particularly important with folding cameras which are intended to be compact.

Such cameras are adapted to be used with flash bar assemblies of the type sold by the General Electric Company. The cameras have within them means to operate in sequence a number of flashes of a flash bar assembly from a battery incorporated into the camera, and with respect to the Polaroid SX70 camera, a battery incorporated into the film pack that is inserted into the camera. The camera, upon operation of the camera-triggering device and operation of the camera shutter, generates an electrical signal at a flash socket assembly carried on the shutter housing, but only if an unused flash is available in the flash bar inserted in the flash socket assembly.

The use of flash bars for flash photography is convenient to many amateur photographers; however, many photographers find the use of flash bars to be too expensive and a need has developed for means permitting rechargeable electronic flash equipment to be used with such cameras. Several such flash units are on the market, but these flash units are bulky, expensive, and are not compatible with a photographer's other equipment.

One example of a commercially available flash unit is sold by International Telephone and Telegraph Corporation under the trademark MAGIC FLASH. This flash unit includes a large base housing, which is approximately the size of the folding camera, on which the folding camera is carried, and a flash tube assembly adapted to plug into the flash socket assembly at the top of the shutter housing. A flexible cable interconnects the flash tube assembly and the housing to transmit a flash signal from the camera to the housing and to operate the flash tube assembly.

Another example of the commercially available flash unit is one sold by Sunpack Corporation of Tokyo, Japan, through its Berkey Marketing Company Division in Woodside, New York, under the trademark SUNPACK 70K. The SUNPACK 70K flash unit includes a large base housing on which a Polaroid SX70 camera can be carried, a post extending upwardly from the base housing to carry an electronic flash and shaped to provide an anatomical hand-grip design for the camera and flash, and a connector adapted to plug into the flash socket assembly at the top of the camera shutter housing that is interconnected with the anatomical hand grip through a flexible cable.

This invention provides a small flash adapter adapted to clamp to the shutter housing of a folding camera, such as the Polaroid SX70 camera. The flash adapter of this invention is so designed that it may be retained on the camera when the camera is folded, and is thus in position and ready to use as the camera is opened. The small flash adapter is carried entirely on the shutter housing of the camera, and is adapted to support and operate a conventional electronic flash upon operation of the camera trigger device and the camera shutter.

A flash adapter of this invention thus forms means to interconnect electrically a conventional flash hot shoe to the flash socket assembly of a folding camera and to support and operate a conventional rechargeable electronic flash assembly. The flash adapter includes a resilient U-shaped bracket adapted to fit the shutter housing of the folding camera and to engage its sides. Preferably, the sides of the shutter housing are engaged by a pair of thin protrusions which may be spring metal. The thin protrusions have thickness, length, and width such that they will fit within the interval between the shutter housing and the adjacent parts of the folding camera when the camera is folded.

The flash adapter carries a plug, preferably in the form of a printed circuit board, in such a position as to fit the camera flash socket assembly on the lens shutter housing and to interconnect an electronic circuit carried by the bracket between the camera and the hot shoe on the bracket. The electronic circuit is small enough to be carried wholly by the bracket and is adapted to trigger an electronic flash when the camera produces a flash signal and upon imposition of the flash signal to the electronic circuit. The invention thus provides a flash adapter that may be carried wholly by the shutter housing of a folding camera, even when the camera is not in use, and that is capable of support and operation of a conventional electronic flash from the camera.

Further advantages of the invention will be apparent from the following description and drawings:

FIG. 1 is an exploded perspective view of a flash adapter of this invention indicating the manner in which it converts the folding camera for use with a conventional electronic flash;

FIG. 2 is a top view of a flash adapter of this invention;

FIG. 3 is a front view of the flash adapter of FIG. 2;

FIG. 4 is a bottom view of the flash adapter of FIGS. 2 and 3; and

FIG. 5 is a schematic drawing showing the flash adapter plug and conventional flash hot shoe and the electronic circuit therebetween.

Referring to FIG. 1, a camera 10 which is collapsible, as more fully described in U.S. Pat. Nos. 3,714,789 and 3,810,221, is shown in its extended operative condition. The camera includes a series of housing members 14, 16, 18 and lens shutter housing 12. The housing members 14, 16, and 18 and lens shutter housing 12 are pivotally connected to form a collapsible four-bar linkage so that the camera may be folded into a flat compact form. An additonal housing member 20 is hinged to the housing member 18 and is normally in the position shown in FIG. 1 for operation of the camera. When in the position shown in FIG. 1, the housing member 20 can form an entry slot for the insertion of a film magazine (not shown). This slot is normally closed by pivoted and resiliently biased light-shielding plate member 22 carried on the housing member 20. A light-tight enclosure for receiving a film magazine is defined by the aforementioned housing members and by a collapsible bellows 24. The housing member 14 supports a collapsible viewing device 26 which includes telescoping blades and a linkage to erect a mirror and lens system when the camera is open and to allow reflex viewing through an objective lens 28 carried by the lens shutter housing 12.

The lens shutter housing 12 is generally parallelopiped in form, having a front wall 30, rearwardly extending side walls 32, and a top wall 34 which extends into laterally projecting locating flanges 36 at each end of the lens shutter housing. The top wall 34 is provided with a flash socket assembly 38 which forms a socket 40 to receive a connecting plug of a flash unit.

The lens shutter housing 12 encloses a suitable shutter mechanism (not shown). The objective lens 28 is centrally mounted in the front wall 30 and surrounded by a bezel 42. To the left of the objective lens is a filter 44 to admit incident light from a scene to be photographed to a photocell (not shown) for controlling the photographic functions of the camera. A camera trigger button 46, or shutter actuator, is at the right of the objective lens 28. The upper edge of the front wall is formed with recesses to accommodate a manual lens-focusing knob 48 and a manual light-dark control knob 50 to adjust the relationship between camera settings and the controlling photocell responses.

Such camera is known in the art and is sold by the Polarid Corporation under their trademark SX70. The crowded conditions of the compact lens shutter housing resulting from the presence of the described elements, combined with the requirement not to interfere with or render any of them inaccessible, poses a problem with respect to the attachment of camera accessories such as flash equipment.

The camera shown in FIG. 1 is adapted to operate a flash bar which comprises ten individual flashes, with each flash being energized in turn from a battery contained in the film pack through the camera socket 40. The flash adapter of this invention is adapted to operate a conventional electronic flash such as those manufactured by Sunpack Corporation of Tokyo, Japan, and sold in the United States through their Sunpack Division, Berkey Marketing Companies, under Model Nos. 90, 120, 220, 320, and 420, and shown in their catalog entitled "An Invitation to Sunpack Electronic Flash Photography From a Conventional Camera Hot Shoe." In addition to the electronic flash made and sold by Sunpack Corporation, corresponding electronic flashes are sold under the trade names VIVATAR and SOLIGOR, with comparable operating characteristics, and such electronic flash can be operated through the use of the flash adapter of this invention.

The flash adapter 60 of this invention provides means to interconnect electrically a conventional flash hot shoe 62 and the flash socket 40 of the camera and to support and operate a conventional electronic flash 100. As shown in FIG. 1, the flash adapter 60 is capable of being fitted to the lens shutter housing 12 of the folding camera with a plug 64 mating the flash socket 40 of the camera. A pair of protrusions 66 on each side of the flash adapter engages the locating flanges 36 at each of the lens shutter housing 12. When the flash adapter 60 is fitted to and pressed down upon the lens shutter housing 12 of the camera, it provides a conventional flash hot shoe 62 at the top of the flash adapter and lens shutter housing assembly in a convenient location for the assembly of a conventional flash attachment 100 in the manner commonly used with such equipment.

The details of the flash adapter are more particularly shown in FIGS. 2-5. As shown more clearly in FIG. 3, the flash adapter comprises a bracket having a generally U-shape. The bracket is defined by a pair of arms 60a and 60b having downwardly depending portions 60c and 60d, respectively, at their outer extremities. Projecting from within the downwardly depending leg portions 60c and 60d are thin protrusions 66. The thin protrusions may be thin spring metal. The thickness, length, and width of the protrusions 66 are such that they will fit within the spaces between the lens shutter housing 12 and the housing portions of the camera adjacent the flanges 36 at each side of the lens shutter housing when the camera is folded. Metal having a thickness of about 0.050 inch or less and the resilience and toughness of spring metal may be used for the protrusions 66. Extending from the underside of the flash adapter intermediate its leg portions 60c and 60d is a plug 64 positioned and adapted to enter flash socket 40 of the camera.

In order that the flash adapter may be easily snapped onto and removed from the camera, it is advisable that it is formed to be resilient in order that the protrusions 66 will be urged into engagement with the flanges 36 of the camera and in order that it may be removed from the camera easily by users. The resilience of the flash adapter is preferably spread over the entire structure by making the legs 60a and 60b resilient, thus permitting a user to snap the flash adapter from the camera by grasping the ends of the downwardly depending legs 60b and 60c and pulling them outwardly and upwardly. The flash adapter may be molded from a resilient plastic material or may be composed of a thin spring metal portion terminating at each side in the flange-engaging protrusions 66 with a molded plastic housing portion to make up the remainder of the flash adapter 60.

To operate the electronic flash 100 from the flash signal appearing at socket 40 of the camera, the flash adapter incorporates a circuit to provide a flash-ready signal to the camera and including electronics to trigger the electronic flash upon operation of the camera shutter button 46. The circuit is interposed between the plug 64 and the flash hot shoe 62 as shown schematically in FIG. 5, and is housed therebetween by the flash adapter portion 60e.

The electronic circuit for an SX70 camera comprises basically means 70 shorting a pair of output connectors at the flash bar socket 40 of the camera. A second pair of conductors 71 and 72 are insulated from each other on plug 64. Each of the second pair of conductors engages and is connected to an output connector (not shown) at the flash bar socket of the camera. The second pair of connectors are resistively interconnected, preferably by a resistor 73 connected between the connectors 71 and 72. The presence of this resistive connection provides a flash-ready signal to the camera. One of the connectors 72 is connected to a triggering input connection, or gate, 74 of a switching semiconductor 75. The other connection 71 is capacitively interconnected with the switching semiconductor 75 as, for example, by a capacitor 76. The output, e.g., the anode and cathode, of the switching semiconductor 75 are connected to the terminals of the hot shoes 62 as shown, for example, at 77 and 78 of FIG. 5.

The elements making up the electronic circuit may be mounted to and interconnected by a printed circuit board in the manner commonly known. Thus, printed circuit board material may be etched to provide the means 70 for shorting a pair of output terminals and each of the pair of conductors 71 and 72 that make up plug 64. A resistor 73 may be soldered to the metallic elements making up the connectors 71 and 72 and connected to a capacitor 76 leading to the switching semiconductor 75. The interconnections 77 and 78 from hot shoe 62 to the output of the switching connector 75 and the capacitor 76 may be made by lead wires in the manner known in the art. Because of the simplicity and small size of the electronic circuit and the components comprising it, the entire electronic circuit may be carried between the plug 64 and the hot shoe 62 and housed within the portion 60e of the flash adapter 60.

Preferably, the means 70 shorting a pair of camera output connectors is a single conducting portion remaining on a printed circuit board making up plug 64. For use with an SX70 camera, the resistive connection is preferably a resistor with a resistance of less than 22 ohms. The capacitive interconnection 76 is a capacitor having a sufficient capacity so that the impedance between the anode and cathode of the switching semiconductor 75, upon triggering, is low enough to substantially "short" the connections 77 and 78 of the hot shoe 62 and thereby trigger the attached electronic flash. A typical switching semiconductor may be a silicon controlled rectifier with its gate input 74 connected to the conductor 72, and its anode and cathode connected to the connections 77 and 78 of the hot shoe 62.

With such a circuit, the camera senses that it may operate a flash through means 70 and 73. The camera presents a flash signal at the connector 72. The signal is applied to the gate 74 of the switching semiconductor 75 which becomes conductive and substantially "shorts" the connections 77 and 78 of the hot shoe 62 to the electronic flash 100, thereby triggering the flash. The camera system, depending upon its adjustment, operates its shutter according to the amount of light it receives from the subject.

As a result of the invention, the flash adapter 60 provides means to mechanically support and operate a conventional electronic flash 100. The flash adapter 60 may be maintained on the camera when it is folded, which makes it convenient to use and avoids loss. The flash adapter is small, simple to use, and inexpensive.

Although the preferred embodiment of my invention is described above, the invention is defined by the scope of the claims which follow.

I claim:

1. A flash adapter for a folding camera, comprising means to interconnect electrically a conventional flash hot shoe and the flash socket assembly of the folding camera and to support and operate an electronic flash assembly, said means including a resilient bracket adapted to engage the sides of the shutter housing of the folding camera and carry an electronic flash attachment, a plug carried by the bracket at its underside to fit into the flash socket assembly on the camera shutter housing, a hot shoe carried by the bracket at its top surface, and an electronic circuit carried within the bracket and adapted to provide a flash-ready signal to camera and to operate the electronic flash upon operation of the camera shutter, said means thereby being adapted to mechanically support and operate the electronic flash.

2. The flash adapter of claim 1 wherein the bracket is a resilient U-shaped bracket with a pair of thin protrusions, with thickness, length, and width such that the protrusions will fit within the interval between the shutter housing and the adjacent camera parts when the camera is folded, thereby permitting the flash adapter to remain connected to the camera when not in use.

3. The flash adapter of claim 1 or claim 2 wherein the electronic circuit comprises
   means shorting a pair of output connectors at the flash socket of the camera,
   a second pair of connections insulated from each other, each one of said second pair of connectors engaging and being connected to an output connector at the flash socket of the camera,
   a resistive interconnection between said second pair of connectors, a capacitive interconnection between the resistive interconnection and a switching semiconductor and an interconnection between said second pair of connectors and the triggering input of the switching semiconductor, the output of said switching semiconductor being connected to said hot shoe so that, upon operation of the camera shutter, a flash signal is generated to trigger an electronic flash carried by said hot shoe.

4. The flash adapter of claim 3 wherein said electronic circuit is carried on a printed circuit board, and the printed circuit board forms the plug, the means shorting a pair of output connections, and the second pair of connectors; the resistive connection is a resistor with a resistance less than about 22 ohms connected between the second pair of connectors; the switching semiconductor device is a silicon-controlled rectifier with its gate input connected with the second pair of connectors and with its output connected across the connections of the hot shoe; and the electronic circuit and printed circuit board is carried within the bracket below the hot shoe with its plug portion exposed.

5. A flash adapter for a folding camera that operates a flash bar from a socket on its shutter housing, comprising
   a resilient U-shaped bracket with a pair of legs adapted to fit the shutter housing of the folding camera and to engage its sides with thin protrusions on each leg of the bracket to carry a hot shoe,
   said protrusions are spring metal with thickness, length, and width such that they will fit within the interval between the shutter housing and the adjacent camera parts when the camera is folded, thereby permitting the flash adapter to remain connected to the camera when not in use,
   an electronic circuit carried by said bracket, said electronic circuit providing a flash-ready signal to camera and triggering of the electronic flash upon operation of the camera shutter, and comprising
   a plug connected to the flash bar socket of the camera with means shorting a pair of output connectors at the flash bar connection of the camera and a second pair of connectors insulated from each other, each one of said second pair of connectors engaging and being connected to an output connector at the flash bar connection of the camera, a resistive interconnection between said second pair of conductors, a capacitive interconnection between the resistive interconnection and a switching semiconductor, an interconnection between said second pair of connections and the triggering input of the switching semiconductor, the output of said switching semiconductor being connected to said hot shoe so that, upon operation of the camera shutter, a flash signal is generated to trigger an electronic flash carried by said hot shoe.

6. The flash adapter of claim 5 wherein the electronic circuit is carried on a printed circuit board, and the printed circuit board forms the plug, the means shorting a pair of output connections, and the second pair of connectors, each engaging and being connected to an output connector of the flash bar socket; the resistive connection is a resistor with a resistance less than about 22 ohms connected between the second pair of connectors; the switching semiconductor device is a silicon-controlled rectifier with its gate input being connected with said second pair of connectors and its output being connected with said hot shoe; and the electronic circuit and printed circuit board is carried within the bracket below the hot shoe with the plug portion exposed underneath the bracket and between its legs.

7. A flash adapter for a folding camera, comprising
a U-shaped bracket with a pair of resilient legs adapted to fit the shutter housing of the folding camera and to engage its sides with a pair of thin protrusions on each leg of the bracket, and to interconnect electrically a flash hot shoe and a flash socket of the folding camera and to support and operate an electronic flash assembly from said hot shoe,
a printed circuit board carried by the bracket to fit into the flash socket on the camera shutter housing, and
an electronic circuit carried by said printed circuit board, providing a flash-ready signal to camera and operation of the electronic flash upon operation of the camera shutter.

8. The flash adapter of claim 7 wherein the thin protrusions have thickness, length, and width such that they will fit within the interval between the lens housing and the adjacent camera parts when the camera is folded, thereby permitting the flash adapter to remain connected to the camera when not in use.

9. The flash adapter of claim 7 wherein the electronic circuit comprises
means shorting a pair of output connectors at the flash socket of the camera,
a second pair of connections insulated from each other, each one of said second pair of connectors engaging and being connected to an output connector at the flash socket of the camera,
a resistive interconnection between said second pair of connectors, a capacitive interconnection between the resistive interconnection and a switching semiconductor and an interconnection between said second pair of connectors and the triggering input of the switching semiconductor, the output of said switching semiconductor being connected to said hot shoe so that upon operation of the camera shutter, a flash signal is generated to trigger an electronic flash carried by said hot shoe.

10. The flash adapter of claim 9 wherein said electronic circuit is carried on a printed circuit board, and the printed circuit board forms the plug, the means shorting a pair of output connections, and the second pair of connectors; the resistive connection is a resistor with a resistance less than about 22 ohms connected between the second pair of connectors; the capacitive interconnection is a capacitor with sufficient capacitance to operate the switching semiconductor; the switching semiconductor device is a silicon-controlled rectifier with its gate input connected with the second pair of connectors and its output connected with the hot shoe; and the electronic circuit and printed circuit board is carried within the bracket below the hot shoe with its plug portion exposed.

* * * * *